United States Patent
Creguer et al.

(10) Patent No.: US 10,275,961 B2
(45) Date of Patent: Apr. 30, 2019

(54) METHOD FOR OPTIMIZING ANTI-COLLISION AND LATENCY FOR PEPS PASSIVE RESPONSE

(71) Applicant: GM GLOBAL TECHNOLOGY OPERATIONS LLC, Detroit, MI (US)

(72) Inventors: Aaron P. Creguer, Fenton, MI (US); Thomas E. Utter, Royal Oak, MI (US); Ron Y. Asmar, West Bloomfield, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 14/622,184

(22) Filed: Feb. 13, 2015

(65) Prior Publication Data
US 2015/0235494 A1    Aug. 20, 2015

Related U.S. Application Data

(60) Provisional application No. 61/940,287, filed on Feb. 14, 2014.

(51) Int. Cl.
| | |
|---|---|
| *G06K 7/00* | (2006.01) |
| *G06K 7/10* | (2006.01) |
| *G07C 9/00* | (2006.01) |

(52) U.S. Cl.
CPC ...... *G07C 9/00309* (2013.01); *G07C 9/00111* (2013.01); *G06K 7/0008* (2013.01);
(Continued)

(58) Field of Classification Search
CPC ...... G07C 9/00309; G07C 2009/00388; G07C 2209/63; B60R 25/2072; B60R 25/24
See application file for complete search history.

(56) References Cited

U.S. PATENT DOCUMENTS 5,721,735 A * 2/1998 Smiroldo .......... H04W 72/0446
  370/442
6,134,692 A * 10/2000 Sekiya ............... G06K 7/10029
  340/10.42
(Continued)

FOREIGN PATENT DOCUMENTS

CN    101197068 A    6/2008
CN    102722930 A    10/2012

OTHER PUBLICATIONS

State Intellectual Property Office of the People's Republic of China, Office Action in Chinese Patent Application No. 201510094578.2 dated Dec. 5, 2016.

*Primary Examiner* — Steven Lim
*Assistant Examiner* — Muhammad Adnan
(74) *Attorney, Agent, or Firm* — Lorenz & Kopf LLP

(57) ABSTRACT

Methods and apparatus are provided for handling the response sequence with geometric elimination of a plurality of keyless fobs. The remote fobs are interrogated with a body control module. A first signal is issued from a first set of remote fobs in a first time slot in response to the interrogation signal from the body control module. A second signal is issued from a second set of remote fobs in a second time slot in response to the interrogation signal from the body control module. The second time slot differs from the first time slot. A first remote fob is authenticated when the first signal is received by the body control module in a free and clear state. The second remote fob is authenticated when the second signal is received by the body control module in the free and clear state. If neither the first nor second signals are received in the free and clear state, the remote fobs are re-interrogated by the body control module.

16 Claims, 2 Drawing Sheets

(52) U.S. Cl.
CPC .............. *G06K 7/10029* (2013.01); *G07C 2009/00793* (2013.01); *G07C 2209/63* (2013.01)

(56) References Cited

U.S. PATENT DOCUMENTS

| | | | |
|---|---|---|---|
| 6,603,388 B1* | 8/2003 | Perraud | G07C 9/00309 340/13.27 |
| 7,362,212 B2* | 4/2008 | Burghard | G06K 7/0008 340/10.1 |
| 2005/0219039 A1* | 10/2005 | Allen | G06K 7/0008 340/10.2 |
| 2008/0111661 A1* | 5/2008 | Lin | G06K 7/0008 340/10.1 |
| 2008/0122594 A1* | 5/2008 | Brecht | B60R 25/24 340/426.11 |
| 2008/0174446 A1* | 7/2008 | Ghabra | B60R 25/2072 340/13.2 |
| 2009/0066477 A1* | 3/2009 | Kaihori | B60R 25/2072 340/5.72 |
| 2010/0182128 A1* | 7/2010 | Kim | G06K 7/0008 340/10.2 |
| 2010/0308961 A1* | 12/2010 | Ghabra | B60R 25/00 340/5.61 |
| 2013/0214900 A1* | 8/2013 | Mitchell | G07C 9/00309 340/5.61 |
| 2014/0114503 A1* | 4/2014 | Ghabra | H04Q 9/00 701/2 |
| 2017/0158168 A1* | 6/2017 | Nantz | G07C 9/00309 |
| 2018/0099643 A1* | 4/2018 | Golsch | B60R 25/24 |

\* cited by examiner

METHOD FOR OPTIMIZING ANTI-COLLISION AND LATENCY FOR PEPS PASSIVE RESPONSE

CROSS-REFERENCE TO RELATED APPLICATIONS

This application claims the benefit of U.S. Provisional Application No. 61/940,287 filed on Feb. 14, 2014. The entire disclosure of the above application is incorporated herein by reference.

TECHNICAL FIELD

The present disclosure generally relates to vehicles having passive entry passive start (PEPS) functionality, and more particularly relates to a method for allowing multiple transmitter IDs to respond to a PEPS system without creating authentication latency.

BACKGROUND

Vehicles equipped with passive entry, passive start (PEPS) functionality are known in the art. With conventional PEPS systems one or two keyless fobs are associated with a given vehicle. Such PEPS vehicle systems generally include a body control module or BCM in the vehicle which is operable to lock and unlock the vehicle doors, release the truck latch, start-up and turn off the engine, hook the horn and other auxiliary vehicle functions. The body control module is also operable to communicate with the keyless fob to activate these vehicle functions.

The PEPS system communicates in one of two modes. In a first mode, a passive command is communicated between the keyless fob and the BCM as a LF signal such that a passive entry is enabled simply by lifting the door handle or a passive start is enable by pushing a start button on the instrument panel. Such passive commands require the keyless fob to be in close proximity with the BCM. In a second mode, an active command is communicated between the keyless fob and the BCM as an RF signal such that an active lock/unlock or a remote engine start is enabled by pushing a button on the keyless fob. Such active commands may be carried out when the keyless fob is a substantial distance from the BCM.

In a PEPS system, such as described above, the BCM interrogates or polls the area immediately around the vehicle using the LF signal to determine how many keyless fobs are within a given response zone. Any keyless fob within this area will respond to the interrogation. If multiple fobs respond, then an overlap or collision of the respective responses may occur requiring repeated interrogation and delayed authentication.

Accordingly, it is desirable to provide a robust method for an unlimited number of PEPS keyless fobs to respond, particularly in fleet vehicle applications, without adversely impacting the overall PEPS authentication time period. In addition, it is desirable to ensure that regardless of the number of keyless fobs within the response zone, the latency time for a single passive challenge event is not increased. Furthermore, other desirable features and characteristics of the present disclosure will become apparent from the subsequent detailed description and the appended claims, taken in conjunction with the accompanying drawings and this background.

SUMMARY

A method is provided for handling the response sequence with geometric elimination of keyless fobs that are not responding such that a unique UID can be confidently identified after no more than 4 queries. In particular, the method authenticates a passive entry, passive start system having a plurality of remote fobs each having a functional transmitter ID. A plurality of remote fobs are interrogated with a body control module. A first signal is issued from at least one first remote fob in a first time slot based on an even operation and in response to the interrogation signal from the body control module. A second signal is issued from at least one second remote fob in a second time slot based on an odd operation and in response to the interrogation signal from the body control module. The second time slot differs from the first time slot. A first remote fob is authenticated when the first signal is received by the body control module in a free and clear state. The second remote fob is authenticated when the second signal is received by the body control module in the free and clear state. If neither the first nor second signals are received in the free and clear state, the remote fobs are re-interrogated by the body control module.

A passive entry, passive start system is also provided having a body control module and a plurality of remote fobs. The body control module is configured to repeatedly interrogate a plurality of remote fobs. The body control module will receive a response signal from at least one first remote fob in a first time slot and a second signal from at least one second remote fob in a second time slot which differs from the first time slot. The first and second remote fobs are selected from the plurality of remote fobs. The body control module authenticates the first remote fob when the first signal is received in a free and clear state and authenticates the second remote fob when the second signal is received in the free and clear state. If neither the first nor second signals are received in the free and clear state, the body control module is configured to re-interrogated the remote fobs. In this regard, each remote fob may be configured to issue the first signal in the first time slot when the functional ID is an even number, and the second signal in the second time slot when the functional ID is an odd number in response to the body control module interrogation. Each remote fob may be configured to issue the first signal in the first time slot when a least significant bit functional ID is an even number, and the second signal in the second time slot when the least significant bit is an odd number. Each remote fob may be further configured to issue the first signal in the first time slot when a second least significant bit functional ID is an even number, and the second signal in the second time slot when the second least significant bit is an odd number.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
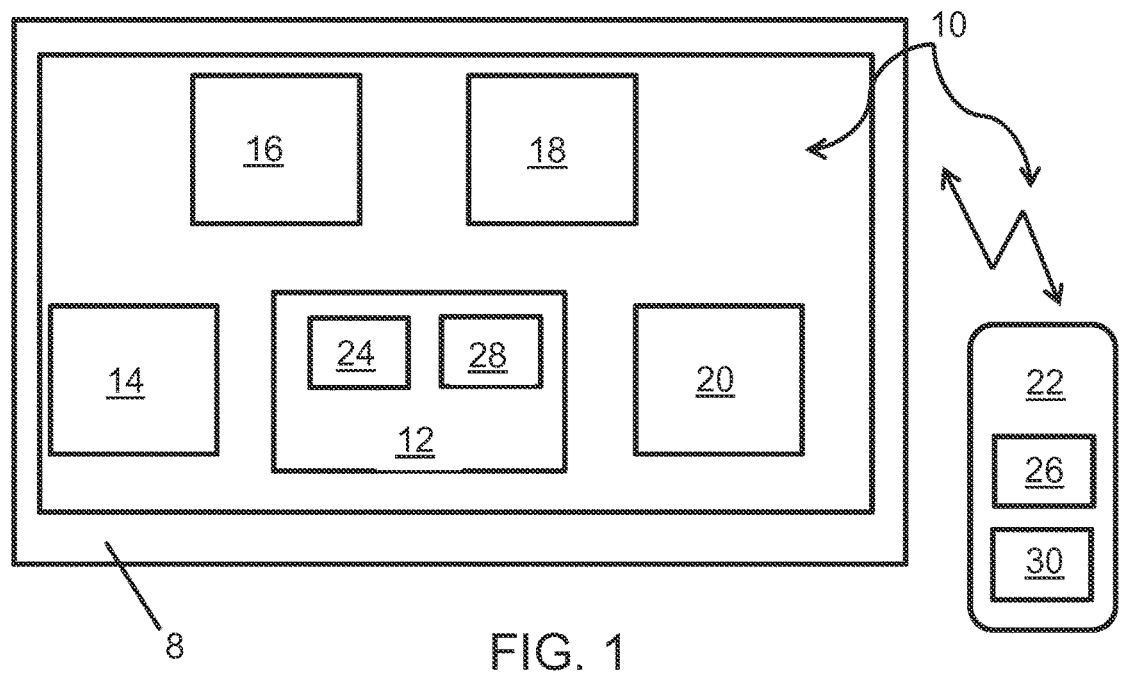
FIG. 1 is a block schematic showing a PEPS system having a BCM and a keyless fob.

With reference FIG. 1, a vehicle 8 having a passive entry, passive start (PEPS) system 10 is schematically shown to include a body control module or BCM 12 and a keyless fob 22. The BCM 12 is operable to a door lock function 14 for locking and unlocking the vehicle doors, a trunk release function 16 for unlatching the truck lock, an engine start function 18 for starting the engine, and a horn function 20 for beeping the horn. The BCM 12 may be configured to operate other auxiliary vehicle functions, e.g., seat heaters, vehicle lights, seat position, etc. The BCM 12 is also operable to wireless communicate with the keyless fob 22 for activating certain vehicle functions. Both the BCM 12 and the keyless fob 22 have data memory—BMC memory 24 and fob memory 26 respectively—which are used to store system identification information and synchronization information for enabling PEPS system functionality.

The BCM 12 includes circuitry 28 which is capable of wirelessly communicating with circuitry 30 in the keyless fob 22. Circuitry 28, 30 are conventional for current PEPS systems and capable of communicating in at least two modes. In a first passive mode, a passive command is communicated between the BCM 12 and the keyless fob 22 as a low frequency or LF signal. As used herein an LF signal is generally known in the art to be a data signal having a carrier frequency in the range of 30-300 kHz and typically on the order of about 125 kHz. Passive commands require the keyless fob 22 to be in close proximity with the BCM 12. In response to a passive challenge the BCM 12 interrogates or polls the area immediately around the vehicle using the LF signal to detect the keyless fob 22. When the keyless fob 22 receives and authenticates the polling signal, a passive command signal will be issued to the BCM 12 for performing a particular function. Typically, passive challenges include a passive entry command for unlocking a door that is enabled by lifting the door handle, a passive trunk release that is enabled by pushing a trunk release button or a passive start command for starting the engine when a start button on the instrument panel is push.

In a second active mode, an active command is communicated between the keyless fob 22 and the BCM 12 as a radio frequency or RF signal. As used herein an RF signal is generally known in the art to be a data signal having a carrier frequency in the range of 300-500 MHz. Active commands are issued in response to pushing a button on the keyless fob 22. Typically, the active commands include an active lock command for locking a door, an active unlock command for unlocking the door, an active remote start command for starting the engine, an active trunk release command for opening the trunk and an alert command for repeatedly honking the horn. Because the active commands are issued as an RF signal, they may be carried out when the keyless fob 22 is a substantial distance from the BCM 12.

Figure 2:
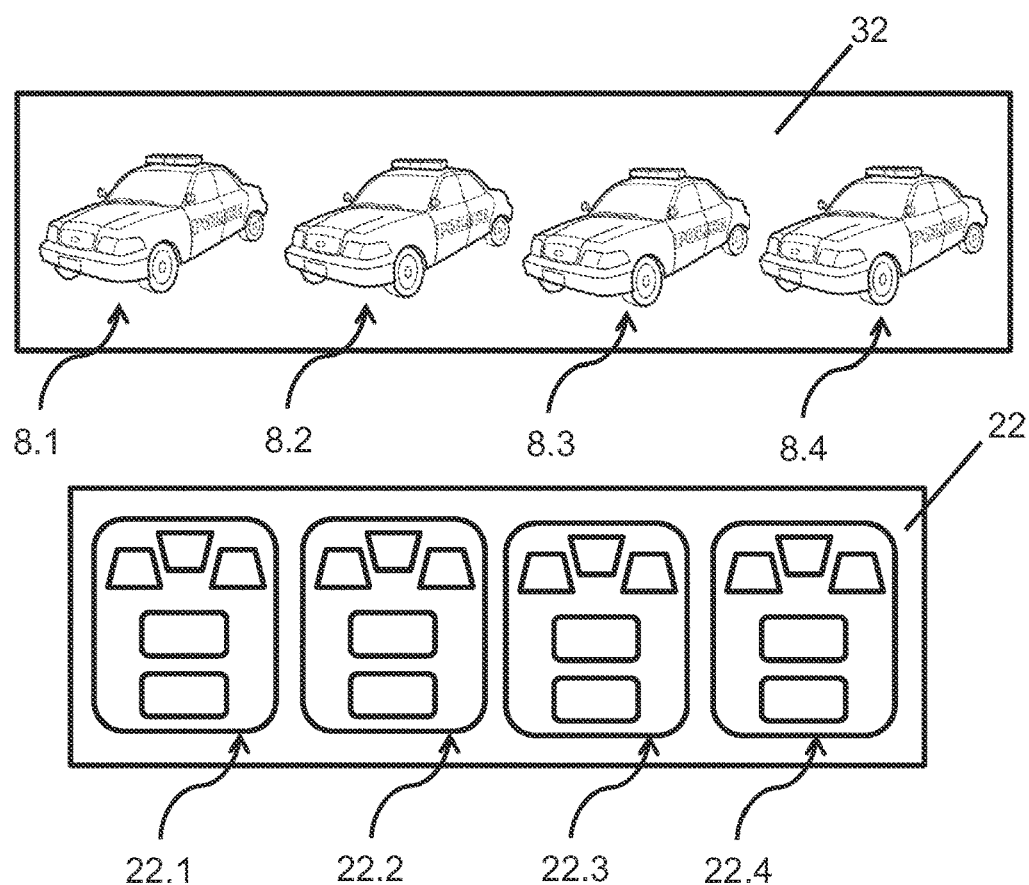
FIG. 2 illustrates a vehicle fleet which may be authenticated to one of several keyless fobs.

FIG. 2 illustrates a PEPS system for a fleet vehicle configuration in which a keyless fob 22 may be selected from a set of keyless fobs 22.1, 22.2, 22.3 22.4, 22.5 and dynamically configured with the BCM 12 in a given vehicle 8 selected from a fleet of vehicles 8.1, 8.2, 8.3, 8.4, using passive authentication of the PEPS system 10. Each BCM 12 is calibrated with a unique vehicle ID or VID in BCM memory 24, and each keyless fob 22 is calibrated with a unique stored transmitter ID or STID in fob memory 26. The VID and STID are used to dynamically configure a functional transmitter ID or UID in the keyless fob 22 which corresponds with a UID calibrated in the BCM of every fleet vehicle. In this way, conventional remote keyless entry functionality can be securely performed on the BCM 12 in the last vehicle used with which the keyless fob 22 was successfully authenticated.

Figure 3:
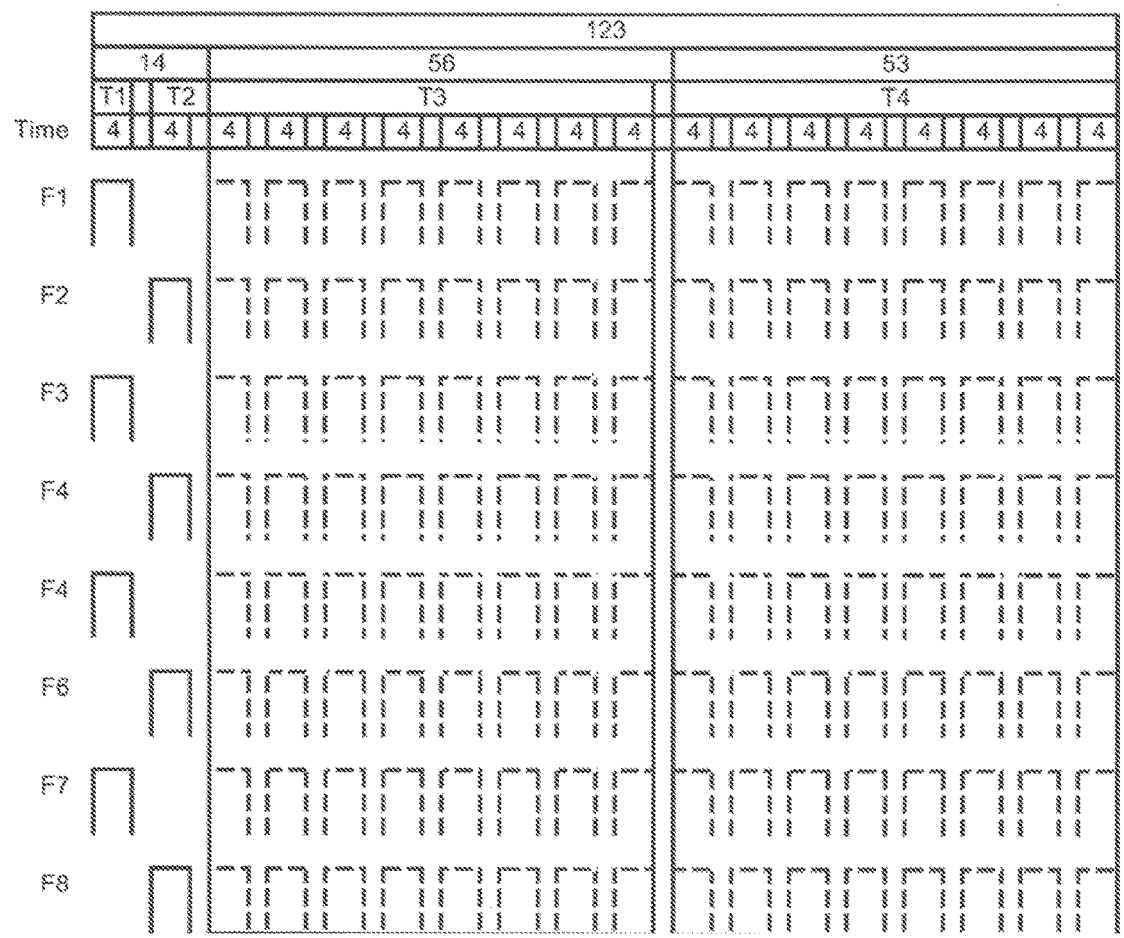
FIG. 3 is a timing chart showing the sequential elimination of non-responsive UIDs.

Conventionally, UID for multiple keyless fobs 22 are associated with a given BCM 12. Typically, the number of unique UIDs learned to a BCM is eight. Thus, the following embodiment will be described in that context. With reference now to FIG. 3, each of eight keyless fobs F1-F8 is scheduled to respond to an interrogation signal issued from the body control module based on a unique UID within a specific time slot T1-T4. In the course of this authentication process the specific time slot during which a particular keyless fob responds may be change. By using a strategic assignment of the response time slot, a unique learned UID may be confidently identified within no more than 3 scans.

In a first interrogation scan, all of the keyless fobs respond in a first time slot T1 or a second time slot T2 based on an even operation or an odd operation of the most recently authenticated UID. In other words, all fobs with an even numbered UID will responds in T1 and all fobs with an odd numbered UID will respond in T2. Responses in time slots T3 and T4 are based on a random number between 1 and 8 generated by the keyless fob 22. If a response which is free and clear from any other response is received by the BCM 12 then successful authentication is achieved. If a free and clear response is not received, then the BCM 12 can eliminate a first subset of keyless fobs based on the response time slot of the fobs that did respond.

In a second interrogation scan, the remaining keyless fobs, in other words those that were not eliminated, respond in the first time slot T1 or the second time slot T2 based on an even operation or an odd operation of the least significant bit of the transmitter ID. In other words, all fobs having a zero (0) as the least significant bit in the transmitter ID will responds in time slot T1 and all fobs having a one (1) as the least significant bit in the transmitter ID will responds in time slot T2. Again the response in time slots T3 and T4 are based on a random number between 1 and 8 generated by the keyless fob 22. If a response which is free and clear from any other response is received by the BCM 12 then successful authentication is achieved. If a free and clear response is not received, then the BCM 12 can eliminate a second subset of keyless fobs based on the response time slot of the fobs that did respond.

In a third interrogation scan, all of the keyless fobs respond in the first time slot T1 or the second time slot T2 based on an even operation or an odd operation of the second least significant bit or LSB of the transmitter ID. In other words, all fobs having a zero (0) as the second least significant bit in the transmitter ID will responds in time T1 and all fobs having a one (1) as the second least significant bit in the transmitter ID will responds in time slot T2. Again response in T3 and T4 are based on a random number between 1 and 8 generated by the keyless fob 22. At this point, there is a 99.9999% likelihood that authentication has been achieved.

The authentication process described above is effective regardless of the number of possible keyless fobs responding to the BCM interrogation. To this point the above sequence can be repeated using the third, fourth, fifth, etc. least significant bits of the transmitter ID if higher confidence is needed. As used herein, the term "even operation" means that the number associated with the even operation is an even number. Conversely, the term "odd operation" means that the number associated with the odd operation is an odd number. In the foregoing embodiments, the numbers associated with the even operations and the odd operations are the functional transmitter ID or UID, as well as the first, second, third, etc. significant bit of the UID. Other numbers which are uniquely associated with the remote fobs may be used in the authentication process described above. As used herein, the term "free and clear state" means that the response signal from at least one remote fob is received by body control module without overlap or collision from another remote fob. As used herein, the term "least significant bit" or lsb means the bit position in a binary integer giving the units value, which is sometimes also referred to as the right-most bit. The second least significant bit would mean the bit position that is immediately left of the lsb. Likewise, the third, fourth, fifth, etc. lsb refers to the bit which is incrementally left of the second lsb.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for authenticating a passive entry, passive start system having a plurality of remote fobs each having a functional transmitter ID comprising:
    (a) interrogating the plurality of remote fobs with a body control module;
    (b) issuing a first signal from at least one first remote fob in a first time slot when an ID number is an even number and in response to an interrogation signal from the body control module, wherein the at least one first remote fob is selected from the plurality of remote fobs, wherein the ID number is at least one bit in the functional transmitter ID;
    (c) issuing a second signal from at least one second remote fob in a second time slot when the ID number is an odd number and in response to the interrogation signal from the body control module, wherein the at least one second remote fob is selected from the plurality of remote fobs and the second time slot differs from the first time slot;
    (d) issuing a response signal from the plurality of remote fobs within at least one of a third time slot and a fourth time slot in response to the interrogation signal from the body control module, wherein the response signal in the at least one of the third time slot and fourth time slot is based on a random number generated by each of the plurality of remote fobs;
    (e) authenticating the at least one first remote fob with the body control module when the first signal and the response signal is received by the body control module in a free and clear state;
    (f) authenticating the at least one second remote fob with the body control module when the second signal and the response signal is received by the body control module in the free and clear state.

2. The method of claim 1 further comprising repeating (a)-(d) when neither the first signal nor the second signals are received by the body control module in the free and clear state.

3. The method of claim 1 further comprises issuing the first signal in the first time slot when the functional ID is an even number, and issuing the second signal in the second time slot when the functional ID is an odd number in response to a first interrogation.

4. The method of claim 3 wherein the plurality of remote fobs are repeatedly interrogated until one of the first signal and the second signal is received in the free and clear state.

5. The method of claim 3 further comprises issuing the first signal in the first time slot when a least significant bit functional ID is an even number, and issuing the second signal in the second time slot when the least significant bit is an odd number in response to a second interrogation.

6. The method of claim 5 further comprises issuing the first signal in the first time slot when a second least significant bit functional ID is an even number, and issuing the second signal in the second time slot when the second least significant bit is an odd number in response to a third interrogation.

7. The method of claim 1 further comprising issuing the response signal from the plurality of remote fobs within the third time slot and the fourth time slot in response to the interrogation signal from the body control module, wherein the response signal is based on a random number generated by each of the plurality of remote fobs.

8. A method for authenticating a passive entry, passive start system having a plurality of remote fobs each having a functional transmitter ID comprising:
    (a) interrogating the plurality of remote fobs with a body control module;
    (b) issuing a first signal from at least one first remote fob in a first time slot when the functional transmitter ID is an even number and in response to an interrogation signal from the body control module, wherein the at least one first remote fob is selected from the plurality of remote fobs;
    (c) issuing a second signal from at least one second remote fob in a second time slot when the functional transmitter ID is an odd number and in response to the interrogation signal from the body control module, wherein the at least one second remote fob is selected from the plurality of remote fobs and the second time slot differs from the first time slot;
    (d) issuing a response signal from the plurality of remote fobs within at least one of a third time slot and a fourth time slot in response to the interrogation signal from the body control module, wherein the response signal in the at least one of the third time slot and fourth time slot is based on a random number generated by each of the plurality of remote fobs;
    (e) authenticating the at least one first remote fob with the body control module when the first signal and the response signal is received by the body control module in a free and clear state; and
    (f) authenticating the at least one second remote fob with the body control module when the second signal and the response signal is received by the body control module in the free and clear state.

9. The method of claim 8 further comprising:
    (g) interrogating the plurality of remote fobs with the body control module when neither the first signal nor the second signals are received by the body control module in the free and clear state;

(h) issuing a first signal from at least one first remote fob in a first time slot when a least significant bit of functional transmitter ID is an even number and in response to the interrogation signal from the body control module, wherein the at least one first remote fob is selected from the plurality of remote fobs;

(i) issuing a second signal from at least one second remote fob in a second time slot when the least significant bit of the functional transmitter ID is an odd number and in response to the interrogation signal from the body control module, wherein the at least one second remote fob is selected from the plurality of remote fobs and the second time slot differs from the first time slot;

(j) authenticating the at least one first remote fob with the body control module when the first signal and the response signal is received by the body control module in a free and clear state; and (k) authenticating the at least one second remote fob with the body control module when the second signal and the response signal is received by the body control module in the free and clear state.

10. The method of claim 9 further comprising:

(l) interrogating the plurality of remote fobs with a body control module when neither the first signal nor the second signals are received by the body control module in the free and clear state;

(m) issuing a first signal from at least one first remote fob in a first time slot when a second least significant bit of functional transmitter ID is an even number and in response to the interrogation signal from the body control module, wherein the at least one first remote fob is selected from the plurality of remote fobs;

(n) issuing a second signal from at least one second remote fob in a second time slot when the second least significant bit of the functional transmitter ID is an odd number and in response to the interrogation signal from the body control module, wherein the at least one second remote fob is selected from the plurality of remote fobs and the second time slot differs from the first time slot;

(o) authenticating the at least one first remote fob with the body control module when the first signal and the response signal is received by the body control module in a free and clear state; and (p) authenticating the at least one second remote fob with the body control module when the second signal and the response signal is received by the body control module in the free and clear state.

11. The method of claim 8 further comprising issuing the response signal from the plurality of remote fobs within the third time slot and the fourth time slot in response to the interrogation signal from the body control module, wherein the response signal is based on a random number generated by each of the plurality of remote fobs.

12. A passive entry, passive start system comprising a body control module and a plurality of remote fobs, wherein the body control is configured to:
repeatedly interrogate a plurality of remote fobs;
receive a response signal from at least one first remote fob in a first time slot, wherein the at least one first remote fob is selected from the plurality of remote fobs and is configured to issue the first signal in the first time slot when at least one bit in the functional ID is an even number;
receive a second signal from at least one second remote fob in a second time slot, wherein the at least one second remote fob is selected from the plurality of remote fobs and the second time slot differs from the first time slot and is configured to issue the second signal in the second time slot when at least one bit of the functional ID is an odd number;
receive a response signal from the plurality of remote fobs within at least one of a third time slot and a fourth time slot, wherein the response signal in the at least one of the third time slot and the fourth time slot is based on a random number generated by each of the plurality of remote fobs;
authenticate the at least one first remote fob with the body control module when the first signal and the response signal is received in a free and clear state; and
authenticate the at least one second remote fob with the body control module when the second signal and the response signal is received in the free and clear state.

13. The system of claim 12 wherein each of the remote fobs are configured to issue the first signal in the first time slot when the functional ID is an even number, and the second signal in the second time slot when the functional ID is an odd number in response to a first interrogation.

14. The system of claim 13 wherein each of the remote fobs are configured to issue the first signal in the first time slot when a least significant bit functional ID is an even number, and the second signal is issued in the second time slot when the least significant bit is an odd number in response to a second interrogation.

15. The system of claim 14 wherein each of the remote fobs are configured to issue the first signal in the first time slot when a second least significant bit functional ID is an even number, and the second signal is issued in the second time slot when the second least significant bit is an odd number in response to a third interrogation.

16. The system of claim 12 wherein the body control is further configured to receive the response signal from the plurality of remote fobs within the third time slot and the fourth time slot in response to the interrogation signal from the body control module, wherein the response signal is based on a random number generated by each of the plurality of remote fobs.

* * * * *